(12) United States Patent
Saarinen

(10) Patent No.: US 6,953,547 B2
(45) Date of Patent: Oct. 11, 2005

(54) METHOD AND APPARATUS FOR FEEDING SOLID MATERIAL AND OXIDIZING GAS INTO A SUSPENSION SMELTING FURNACE

(75) Inventor: Risto Saarinen, Niittykuja (FI)

(73) Assignee: Outokumpu Technology Oy, Espoo (FI)

(*) Notice: Subject to any disclaimer, the term of this patent is extended or adjusted under 35 U.S.C. 154(b) by 139 days.

(21) Appl. No.: 10/451,351

(22) PCT Filed: Dec. 11, 2001

(86) PCT No.: PCT/FI01/01077
§ 371 (c)(1),
(2), (4) Date: Jun. 19, 2003

(87) PCT Pub. No.: WO02/055746
PCT Pub. Date: Jul. 18, 2002

(65) Prior Publication Data
US 2004/0053185 A1 Mar. 18, 2004

(30) Foreign Application Priority Data
Dec. 20, 2000 (FI) .............................. 20002799

(51) Int. Cl.⁷ ................................. C22B 5/12
(52) U.S. Cl. .................. 266/182; 266/172; 432/144
(58) Field of Search ................ 266/182, 172; 432/144

(56) References Cited

U.S. PATENT DOCUMENTS

| | | | |
|---|---|---|---|
| 2,951,756 A | 9/1960 | Cavanagh | 75/40 |
| 4,331,087 A | 5/1982 | Kunttu et al. | 110/264 |
| 4,493,732 A | 1/1985 | Melcher et al. | 75/24 |
| 4,596,235 A | 6/1986 | Bougard | 126/350 R |
| 5,362,032 A * | 11/1994 | Ranki | 266/182 |
| 5,542,361 A | 8/1996 | Lilja et al. | 110/341 |
| 5,674,310 A * | 10/1997 | Miralles et al. | 266/182 |

FOREIGN PATENT DOCUMENTS

| | | | |
|---|---|---|---|
| DE | 38 32 843 C1 | | 10/1989 |
| WO | WO 98/14741 | * | 4/1998 |

* cited by examiner

Primary Examiner—Scott Kastler
(74) Attorney, Agent, or Firm—Morgan & Finnegan, LLP

(57) ABSTRACT

The invention relates to an apparatus for feeding finely divided solids, containing at least sulphidic metal concentrate, and oxygenous oxidizing gas into a suspension smelting furnace, said apparatus comprising elements for conducting solids and oxidizing gas into the suspension smelting furnace. According to the invention, in the feed orifice (7) of the suspension smelting furnace through which solids (2) and oxidizing gas (3) are fed into the reaction chamber (1) of the suspension smelting furnace, there is installed a suspension creation chamber (5,11) for a suspension containing solids (2) and oxidizing gas (3), in which chamber the solids (2) and at least part of the oxidizing gas (3) can be mixed to form a suspension before they flow into the reaction chamber (1) of the suspension smelting furnace.

11 Claims, 2 Drawing Sheets

Figure 1:
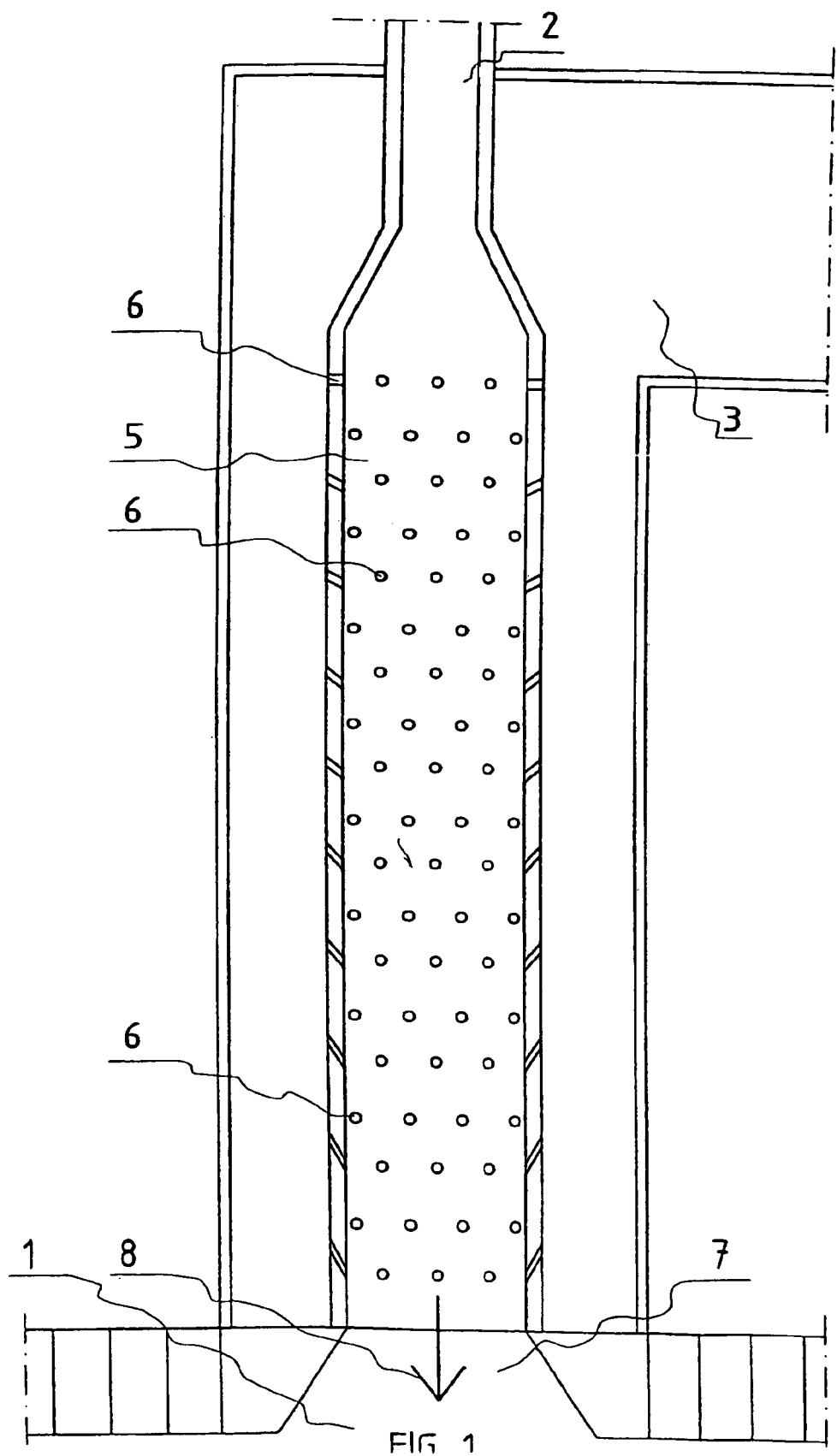

METHOD AND APPARATUS FOR FEEDING SOLID MATERIAL AND OXIDIZING GAS INTO A SUSPENSION SMELTING FURNACE

The present invention relates to an apparatus that is used for feeding finely divided solid material containing at least finely divided sulphidic metal concentrate into a suspension smelting furnace together with an oxygenous oxidizing gas.

In the smelting of finely divided sulphidic metal concentrates, such as copper, nickel and lead, there is generally employed a suspension smelting furnace comprising the following elements: a vertical reaction shaft and a vertical exhaust gas uptake shaft, which are interconnected by means of a horizontal settler. The melting of the metal concentrate mainly takes place in the vertical reaction shaft, into the top part whereof there is fed metal concentrate, oxygenous gas, slag-forming agent and flue dust obtained from the process circulation. In the settler of the suspension smelting furnace, the molten feed material creates, as a result of the smelting reactions, at least two molten phases: a slag phase and a sulphidic matte phase. Moreover, as a result of the selected smelting conditions, instead of the sulphidic matte phase, underneath the slag phase there can be created a molten raw metal phase.

In order to advantageously realize the reactions between the ingredients fed into the suspension smelting furnace, i.e. between solid material, concentrate, slag-forming agent and flue dust as well as oxygenous gas, there are developed concentrate burners whereby the solids and gas are made to react. A burner of this type is described in the U.S. Pat. No. 4,392,885, where gas is divided, mainly by means of radial partition walls, into three or more sub-flows, which sub-flows are then directed towards the solid material fed in at the middle part of the apparatus, essentially on all sides in order to carry out the smelting reactions. Another such concentrate burner is described in the U.S. Pat. No. 5,133,801, where part of the oxygenous gas is conducted in the middle of the solid material circulation, so that the solid material flows into the suspension smelting furnace between two separate gas flows. Similar burners are also described for instance in the U.S. Pat. Nos. 5,358,222, 5,362,032, 5,542,361 and 5,674,310. In these concentrate burners, both the mixing of the solid material with the oxygenous gas and the combustion take place in the same space, in the reaction shaft of the suspension smelting furnace. Combustion begins immediately when the mixing has begun, even to a slight degree, i.e. immediately when the solid material meets the oxygenous gas and the ignition temperature of the solid material is reached. At this initial stage, there is an excessive amount of oxygen present at the reaction, and a powerful overoxidation takes place in the solid material. Because the adjusting of the smelting process in the suspension smelting furnace is based on the scarcity of oxygen, there is not enough oxygen left towards the end of the process, and part of the solid material is left underoxidized. The over- and underoxidized combustion products react together in the molten slag and matte phases located underneath the reaction shaft. However, the most finely divided and simultaneously most oxidized part of the combustion product does not participate this reaction, but continues as such along with the gas into the settler of the suspension smelting furnace. This part contains, among others, nearly all of the volatilized material, such as the volatilized share of the copper.

The quantity of the finely divided part of the combustion product is about 20% by weight of the whole supply fed into the suspension smelting furnace, and it contains nearly all of the copper and iron in oxide form. About half of this combustion product proceeds, via the uptake shaft of the suspension smelting furnace, to a waste heat boiler connected to the suspension smelting furnace, and half of said combustion product remains in the settler and uptake shaft of the suspension smelting furnace, on the surfaces of the lining provided on the walls of the settler and uptake shaft of the suspension smelting furnace. From the wall linings, the combustion product flows down, onto the surface of the molten slag phase located in the settler. Thus the molten slag phase is essentially throughout the suspension smelting furnace in balance with the oxide phase, which contains about 25–35% by weight of oxidized copper.

This condition of balance keeps the copper content of the slag phase high throughout the suspension smelting furnace, particularly underneath the uptake shaft, where the molten slag phase is usually let out of the suspension smelting furnace.

There have been attempts to alleviate the non-homogeneous nature of the oxidizing reactions for instance by means of an arrangement described in the U.S. Pat. No. 4,493,732, where the particles to be smelted and the reaction gas are mixed in a stoichiometric ratio in a special mixing zone, so that an overpressurized suspension is created. Said suspension is then fed via an acceleration jet into the reaction space, where from outside the suspension feed, there also is fed reaction gas in order to make the suspension reach the ignition point. However, the use of overpressurized suspension as such is not advantageous owing to a danger of explosion.

The object of the present invention is to eliminate some of the drawbacks of the prior art and to realize an improved apparatus for feeding finely divided solids and oxygenous gas into a suspension smelting furnace, in which apparatus the combustion product of the feed material is made more homogeneous than before. The essential novel features of the invention are enlisted in the appended claims.

In an apparatus according to the invention for feeding solids and oxidizing gas into a suspension smelting furnace, at least part of the oxygenous gas fed into the suspension smelting furnace is put into contact with the finely divided solid material fed into the suspension smelting furnace in order to create an essentially homogeneous suspension before the oxidizing gas and the finely divided solids flow into the reaction chamber of the suspension smelting furnace. In order to prevent the suspension from igniting, the suspension velocity is kept, as the suspension reaches the reaction chamber of the suspension smelting furnace, essentially higher than the combustion velocity of the suspension.

In an apparatus according to the invention, in order to feed solids and oxidizing gas into a suspension smelting furnace, the finely divided solid material, which at least contains some sulphidic metal concentrate and slag-forming agent but can also contain flue dust circulated in the smelting process and possibly sulphidic matte to be fed into the suspension smelting furnace, is fed in through a concentrate supply conduit. The concentrate supply conduit is further mechanically connected to a suspension creation chamber. In the concentrate supply conduit, near the suspension chamber junction, there can be installed a concentrate distributor that distributes the solid material fed into the suspension smelting furnace towards the walls of the suspension creation chamber. Into the suspension creation chamber, there also is conducted at least part of the oxidizing gas fed into the suspension smelting furnace and containing air, oxygen-enriched air or oxygen, via nozzles installed in the walls of the suspension creation chamber. Further, the suspension creation chamber is, with respect to the concentrate supply conduit, connected to the feed orifice of the suspension smelting furnace at its opposite end, so that the suspension formed of solids and oxidizing gas has free access to flow from the suspension creation chamber directly to the reaction chamber of the suspension smelting furnace.

The suspension creation chamber constitutes a chamber, in the wall whereof there are installed nozzles on at least one but preferably several levels that are located at varying distances from the orifice of the reaction chamber. In order to obtain a homogeneous suspension, essentially at an equal distance from the feed orifice of the reaction chamber of the suspension smelting furnace, there are installed several nozzles on both sides of the wall of the suspension creation chamber, so that the nozzles placed essentially at the same distance from the orifice of the reaction chamber of the suspension smelting furnace are advantageously located at essentially equal distances from each other. In the wall of the suspension creation chamber, nozzles are advantageously installed so that the area provided with nozzles is at least 80%, advantageously at least 90% of the total length of the wall of the suspension creation chamber.

The nozzles installed in the wall of the suspension creation chamber are directed so that the nozzle angle with respect to the suspension flowing direction is, with nozzles that are located at an essentially equal distance from the orifice of the reaction chamber of the suspension smelting furnace, essentially equal, but the size of the nozzle angle with respect to the suspension flowing direction is gradually reduced and is smallest with nozzles that are installed nearest to the orifice of the reaction chamber of the suspension smelting furnace. The nozzles are advantageously installed in the wall of the suspension creation chamber so that the gas flowing from the nozzles is directed in an essentially radial fashion towards the middle part of the suspension creation chamber. The nozzles can also be installed so that at least part of the nozzles are directed tangentially towards the adjacent nozzle, in which case the gas flows at least partly towards the wall of the suspension creation chamber.

The nozzle angle of a nozzle installed in the wall of the suspension creation chamber with respect to the flowing direction of the suspension advantageously varies within the range 30–90 degrees, so that the nozzle angle is largest in that end of the suspension creation chamber where the solids are fed, and smallest in that end of the suspension creation chamber from which the suspension flows into the reaction chamber of the suspension smelting furnace. Advantageously the nozzle angle with respect to the flowing direction of the suspension is largest near the feeding point of the solids, because in that case the oxidizing gas is advantageously and rapidly mixed with the solids that are directed near the vicinity of the wall of the suspension creation chamber. The fact that the size of the nozzle angle is reduced when proceeding towards the reaction chamber of the suspension smelting furnace helps to keep the suspension flowing velocity sufficiently high, so that the suspension is not ignited before it reaches the reaction chamber of the suspension smelting furnace.

According to the invention, the creation chamber of the suspension to be fed in a suspension smelting furnace advantageously is essentially circular in cross-section and is installed in an essentially vertical position, so that the solids are fed at the top end of the suspension creation chamber, and the created suspension is removed at the bottom end of the suspension creation chamber. In addition, with respect to the flowing direction of the oxidizing gas fed into the suspension smelting furnace, the suspension creation chamber is advantageously installed so that the circulation of the oxidizing gas surrounds the suspension creation chamber at essentially all directions. Thus the oxidizing gas can freely flow to the suspension creation chamber in an essentially even fashion through the nozzles provided on both sides of the wall.

The employed suspension creation chamber can also be a chamber that is essentially annular in shape, in which case the oxidizing gas fed into the suspension smelting furnace is conducted into the suspension creation chamber in two batches; part of the oxidizing gas fed into the suspension creation chamber is conducted to the suspension creation chamber via nozzles installed in the inner wall of the suspension creation chamber, and part is conducted via nozzles installed in the outer wall of the suspension creation chamber.

Figure 2:
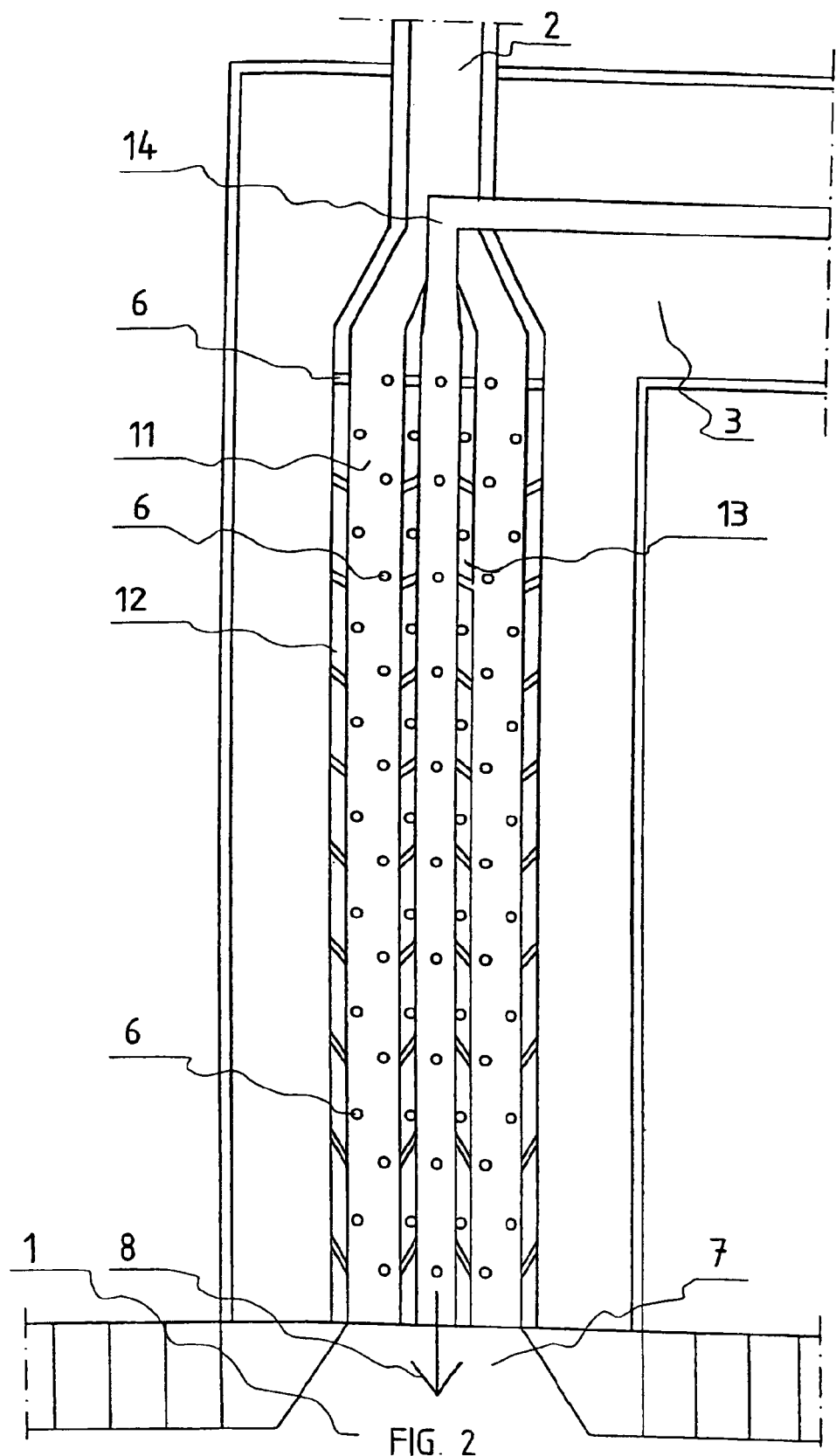

The invention is described in more detail below with reference the appended drawings, where FIG. 1 illustrates a preferred embodiment of the invention in a schematical side-view illustration that is shown in a partial cross-section, and FIG. 2 illustrates another preferred embodiment of the invention in a schematical side-view illustration that is shown in a partial cross-section.

According to FIG. 1, in the top part of the reaction chamber 1 of a suspension smelting furnace, there are installed conduits for feeding solids 2 and oxidizing gas 3 into the suspension smelting furnace. Prior to conducting the solids from the conduit 2 to the reaction chamber of the suspension smelting furnace, the solids are transferred to a suspension creation chamber 5 that is mechanically connected to the conduit 2 and is essentially circular in shape. In the wall of the suspension creation chamber 5, there are installed nozzles 6 through which the oxidizing gas flowing from the conduit 3 is conducted to the suspension creation chamber 5. The nozzle angle of the nozzles 6 with respect to the suspension flowing direction 8 is gradually reduced, so that it is smallest with nozzles that are located nearest to the reaction chamber 1 of the suspension smelting furnace. The suspension creation chamber 5 is connected to the feed orifice 7 of the reaction chamber 1 of the suspension smelting furnace at the opposite end in relation to the conduit 2. Thus the suspension created in the suspension creation chamber 5 has free access to flow directly into the reaction chamber 1 of the suspension smelting furnace.

The embodiment according to FIG. 2 deviates from the arrangement illustrated in FIG. 1 in that the suspension creation chamber 11 is essentially annular in cross-section, in which case the suspension creation chamber 11 constitutes an outer wall 12 and an inner wall 13. Both the outer wall 12 and the inner wall 13 are provided with nozzles 6 in order to conduct oxidizing gas, to be fed into the suspension smelting furnace, to the suspension creation chamber 11. Part of the oxidizing gas flowing from the conduit 3 is conducted along a pipe 14 onto the inner wall 13 of the suspension creation chamber 11 and further via nozzles 6 to the suspension creation chamber 11.

What is claimed is:

1. An apparatus for feeding finely divide solids, containing at least sulphidic metal concentrate, and oxygenous oxidizing gas into a suspension smelting furnace, said apparatus comprising elements for conducting solids and oxidizing gas into the suspension smelting furnace, a feed orifice of the suspension smelting furnace through which solids and oxidizing gas are fed into a reaction chamber of the suspension smelting furnace containing a suspension creation chamber for a suspension containing solids and oxidizing gas in which chamber the solids and at least part of the oxidizing gas can be mixed to form a suspension before they flow into the reaction chamber of the suspension smelting furnace so that the suspension creation chamber is, with respect to a concentrate supply conduit, connected to the feed orifice of the suspension smelting furnace at its opposite end in order that the suspension formed of solids and oxidizing gas has free access to flow from the suspension creation chamber directly to the reaction chamber of the suspension smelting furnace.

2. An apparatus according to claim 1, wherein nozzles are installed in a wall of the suspension creation chamber at varying distance from the feed orifice of the reaction chamber of the suspension smelting furnace in order to conduct oxidizing gas into the suspension creation chamber.

3. An apparatus according to claim 1 wherein nozzles installed in a wall of the suspension creation chamber, at an essentially equal distance from the feed orifice of the reaction chamber of the suspension smelting furnace, are installed at essentially equal distances from each other.

4. An apparatus according to claim 2, wherein the nozzles installed in the wall of the suspension creation chamber have nozzle angles within the range 30–90 degrees with respect to the suspension flowing direction.

5. An apparatus according to claim 2, wherein the nozzles installed in the wall of the suspension creation chamber have nozzle angles with respect to the suspension flowing direction dependent on the distance of the nozzles from the feed orifice of the reaction chamber of the suspension smelting furnace, and further wherein the size of the nozzle angles with respect to the suspension flowing direction is gradually reduced and is smallest with nozzles that are installed nearest to the orifice of the reaction chamber of the suspension smelting furnace.

6. An apparatus according to claim 5, wherein the nozzle angle of the nozzles installed in the wall of the suspension creation chamber with respect to the suspension flowing direction is smallest with nozzles located nearest to the feed orifice of the reaction chamber of the suspension smelting furnace.

7. An apparatus according to claim 2, wherein an area in the suspension creation chamber that is provided with nozzles constitutes at least 80% of the total length of the wall of the suspension creation chamber.

8. An apparatus according to claim 2, wherein an area in the suspension creation chamber that is provided with nozzles constitutes at least 90% of the total length of the wall of the suspension creation chamber.

9. An apparatus according to claim 1, wherein the suspension creation chamber is essentially circular in cross-section.

10. An apparatus according to claim 1, wherein the suspension creation chamber is essentially annular in cross-section.

11. An apparatus according to claim 1, wherein the suspension creation chamber is not overpressurized.

* * * * *